(12) United States Patent
Choi

(10) Patent No.: US 7,152,770 B2
(45) Date of Patent: Dec. 26, 2006

(54) MEMO HOLDER FOR AUTOMOBILE

(75) Inventor: Jae-seob Choi, Yongin-shi (KR)

(73) Assignee: Hyundai Mobis Co., Ltd., Seoul (KR)

( * ) Notice: Subject to any disclaimer, the term of this patent is extended or adjusted under 35 U.S.C. 154(b) by 409 days.

(21) Appl. No.: 10/722,392

(22) Filed: Nov. 28, 2003

(65) Prior Publication Data
US 2005/0082327 A1 Apr. 21, 2005

(30) Foreign Application Priority Data
Oct. 17, 2003 (KR) .................. 10-2003-0072657

(51) Int. Cl.
B60R 9/00 (2006.01)
B60R 7/00 (2006.01)
F41C 33/02 (2006.01)
A45F 5/00 (2006.01)

(52) U.S. Cl. .................. 224/483; 224/502; 224/244; 224/282; 224/276; 224/269

(58) Field of Classification Search .......... 224/480, 224/506, 502, 244, 282, 462, 276, 269, 930, 224/669, 670, 483
See application file for complete search history.

(56) References Cited

U.S. PATENT DOCUMENTS

| 5,988,572 | A | * | 11/1999 | Chivallier et al. ....... 248/176.1 |
| 6,138,969 | A | * | 10/2000 | Olausson ............... 248/222.52 |
| 6,283,348 | B1 | * | 9/2001 | Wang .......................... 224/271 |
| 6,341,218 | B1 | * | 1/2002 | Poplawsky et al. ...... 455/569.1 |
| 6,755,455 | B1 | * | 6/2004 | Choi ....................... 296/37.12 |

FOREIGN PATENT DOCUMENTS

JP 2001-301533 10/2001
JP 2002-240635 8/2002

OTHER PUBLICATIONS

English Language Abstract JP 2002-240635.
English Language Abstract JP 2001-301533.

* cited by examiner

Primary Examiner—Jes F. Pascua
Assistant Examiner—Lester L. Vanterpool
(74) Attorney, Agent, or Firm—Greenblum & Bernstein, P.L.C.

(57) ABSTRACT

The memo holder for automobiles is installed in an automobile so that the outer surface of the memo holder coincides with the outer surface of an instrument panel, thus storing papers as well as cards made of a hard material.

5 Claims, 3 Drawing Sheets

MEMO HOLDER FOR AUTOMOBILE

RELATED APPLICATION

The present disclosure relates to subject matter contained in Korean application No. 2003-72657, filed on Oct. 17, 2003, which is herein expressly incorporated by reference its entirety.

BACKGROUND OF THE INVENTION

1. Field of the Invention

The present invention relates to a memo holder for automobiles, and more particularly to a memo holder, which is installed in an automobile so that an outer surface of the memo holder with an outer surface of an instrument panel, thus storing papers as well as cards made of hard or soft materials.

2. Description of the Related Art

Generally, a driver who wants to drive on an expressway or use a parking lot, must take a highway ticket or a parking card, and then store it temporarily in the automobile.

Thus, a card holder for storing various cards and/or tickets is installed on the rear surface of a sun-visor or instrument panel in automobiles.

However, the conventional card holder is disadvantageous in that it can store cards or tickets, made of a hard material, but cannot store papers made of a soft material.

Conventionally, automobiles are not provided with any additional holder for storing papers, such as scratch papers. Thus, a driver, who wants to store papers, purchases an additional holder for storing papers, and then attaches it to the instrument panel using a double-sided adhesive agent.

However, the paper holder attached to the instrument panel using the double-sided adhesive agent defiles the appearance of the instrument panel and has a low marketability.

SUMMARY OF THE INVENTION

Therefore, the present invention has been made in view of the above problems, and it is an object of the present invention to provide a memo holder, which is installed in an automobile so that an outer surface of the memo holder coincides with an outer surface of an instrument panel, thus storing papers made of a soft material as well as cards made of a hard material.

In accordance with the present invention, the above and other objects can be accomplished by the provision of a memo holder for automobiles comprising: a main body fixed to a designated position inside a groove formed in an instrument panel of an automobile, and provided with an internal portion formed by a depression formed into a front surface by a designated depth; a holder formed at a lower area of the internal portion of the main body; a push cover rotatably hinged to the front surface of the main body; and an elastic member interposed between the push cover and the main body for providing an elastic force to the push cover when the push cover is rotated.

Preferably, the holder may include: a protrusion wall formed along an edge of the holder; and a support plate connected to an outer circumference of the protrusion wall.

Further, preferably, a pair of fixtures may be formed at a central area of the internal portion of the main body, a pair of connectors may be formed at a central area of a rear surface of the push cover so that the connectors face the fixtures, and a hinge pin may be inserted into the fixtures, the connectors and the elastic member under the condition that the elastic member is interposed between the fixtures and the connectors.

Moreover, preferably, an outer surface of the push cover may coincide with an outer surface of the instrument panel.

The memo holder of the present invention has a clamp structure, which is inserted into the instrument panel, for storing papers as well as cards made of a hard material by allowing the upper portion of the push cover to be pressed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 1:
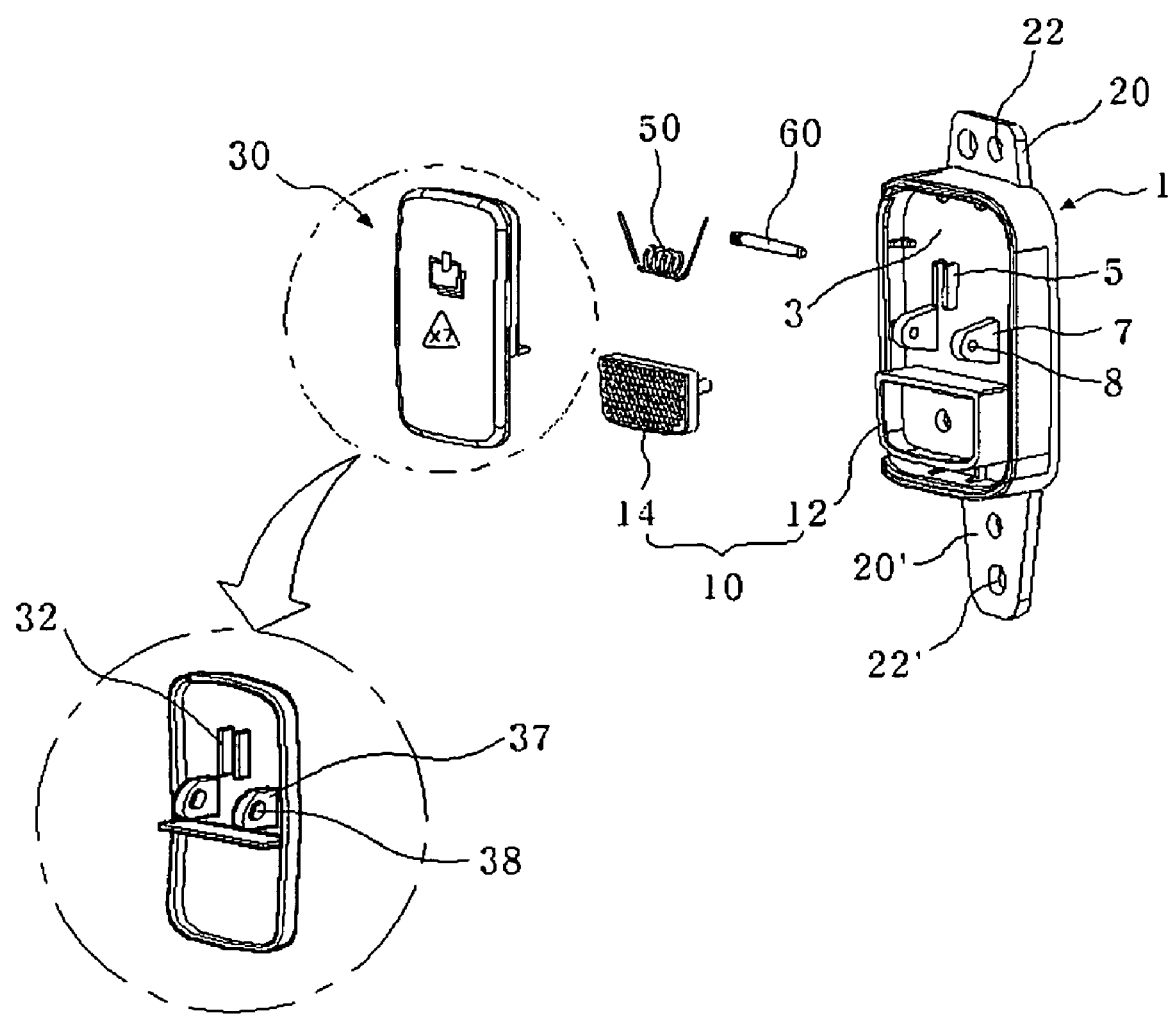
FIG. 1 is an exploded perspective view of a memo holder for automobiles in accordance with the present invention.
Figure 2:
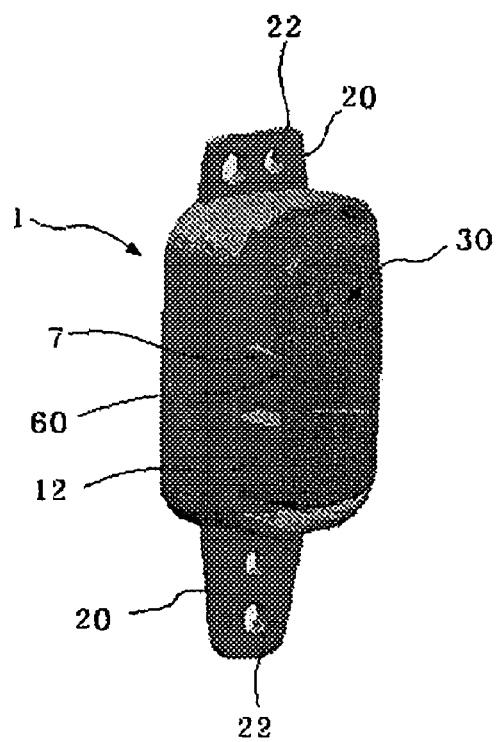
FIG. 2 is an assembled perspective view of FIG. 1.
Figure 3:
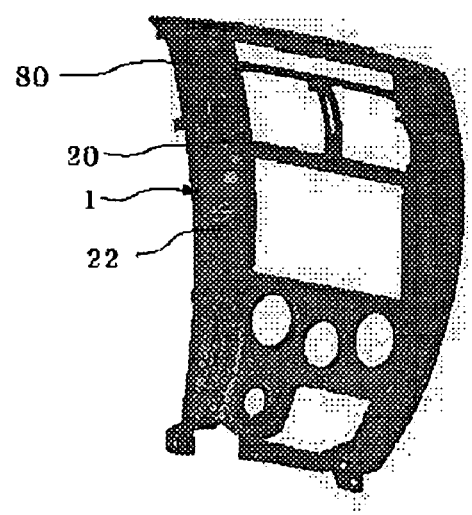
FIG. 3 is a perspective view of the memo holder for automobiles of the present invention, which is installed in an instrument panel.
Figure 4:
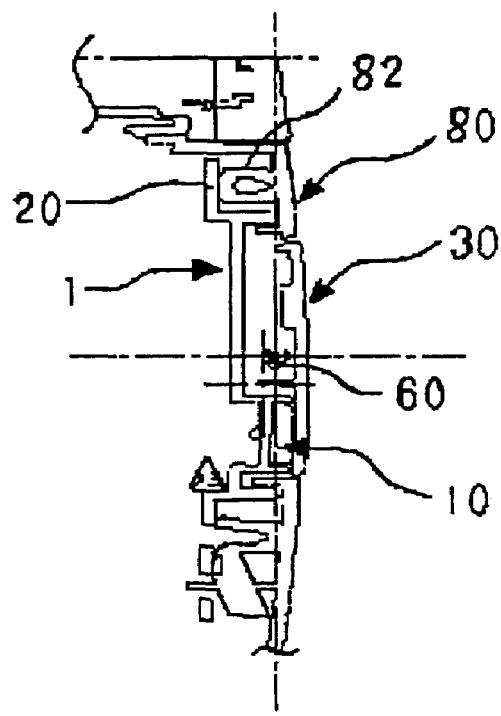
FIGS. 4 and 5 are cross-sectional views illustrating operation of the memo holder for automobiles in accordance with the present invention.
Figure 5:
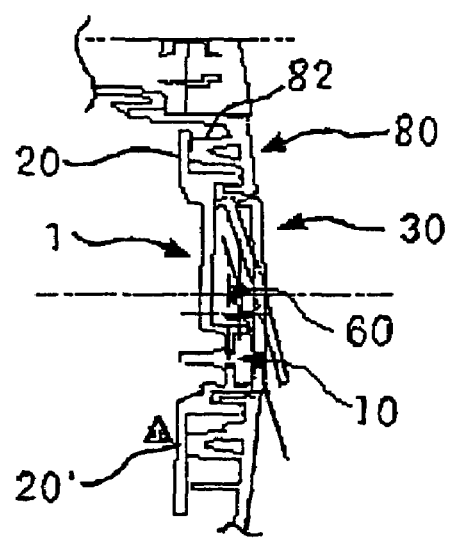

FIG. 1 is an exploded perspective view of a memo holder for automobiles in accordance with the present invention. FIG. 2 is an assembled perspective view of FIG. 1. FIG. 3 is a perspective view of the memo holder for automobiles of the present invention, which is installed in an instrument panel. FIGS. 4 and 5 are cross-sectional views illustrating operation of the memo holder for automobiles in accordance with the present invention.

As shown in FIG. 1, in the memo holder of the present invention, a push cover 30 is hinged to a main body 1 so that the push cover 30 is rotated inward by the elastic force of an elastic member 50.

The main body 1 includes an internal portion 3 formed by a depression formed into a front surface by a designated depth.

A pair of supporting protrusions 5, a pair of fixtures 7 and a holder 10 are formed on the internal portion 3 of the main body 1, and clamping brackets 20 and 20' provided with assembling holes 22 and 22', which serve to fix the main body 1 to an instrument panel 80, are extended from upper and lower ends of the main body 1.

A pair of the supporting protrusions 5, which protrud from the internal portion 3 of the main body 1, serve to support the position of the elastic member 50, and have a designated length in a lengthwise direction.

A pair of the fixtures 7, which are located below the supporting protrusions 5, serve to connect the push cover 30 to the main body 1.

Here, the distance between both fixtures 7 is longer than the distance between both supporting protrusions 5, and a through hole 8, for receiving a hinge pin 60 when the push cover 30 is connected to the main body 1, is formed through each of the fixtures 7.

The fixtures 7 are located at a central portion of the internal portion 3 of the main body 1.

The holder 10, which is located at a lower area of the internal portion 3 of the main body 1, includes a protrusion wall 12 formed along the edge of the holder 10, and a support plate 14 connected to an outer circumference of the protrusion wall 12.

Shapes and sizes of the protrusion wall 12 and the support plate 14 may be varied according to a worker's intension. Preferably, the protrusion wall 12 and the supporting plate 14 have shapes and sizes corresponding to each other so that the protrusion wall 12 and the support plate 14 are easily connected to each other.

Here, the holder 10 has a height the same as or higher than the height of the circumferential wall of the main body 1.

In accordance with this embodiment of the present invention, the support plate 14 of the holder 10 has a plate shape, and has an external surface with an embossed structure.

The push cover 30 is hinged to the internal portion 3 formed in the front surface of the main body 1. The push cover 30 has a shape similar to that of the internal portion 3 of the main body 1, and is located in the internal portion 3 of the main body 1.

A pair of connectors 37 corresponding to a pair of the fixtures 7 formed on the main body 1 are formed on a rear surface of the push cover 30.

Further, an insertion hole 38, for receiving the hinge pin when the push cover 30 is connected to the main body 1, is formed through each of the connectors 37. A distance between the connectors 37 is suitably adjusted such that the connectors 37 contact external side surfaces of the fixtures 7 or contact internal side surfaces of the fixtures 7.

Here, a pair of the connectors 37 are located at a central portion of the rear surface of the push cover 30.

Accordingly, when the push cover 30 is inserted into the internal portion 3 of the main body 1 and the hinge pins 60 are inserted into the through holes 8 of the fixtures 7 of the main body 1 and the insertion holes 38 of the connectors 37 of the push cover 30, the push cover 30 is hinged to the main body 1 so that the push cover 30 is rotatable toward the inside of the main body 1.

Here, the elastic member 50 for providing elastic force to the push cover 30 is located at the connectors 37 on the rear surface of the push cover 30. The elastic member 50 has front and rear ends having symmetric shapes extending in the same direction.

The elastic member 50 is interposed between the connectors 37 of the push cover 30 and the fixtures 7 of the main body 1 under the condition that the connectors 37 face the fixtures 7, and the hinge pin 60 is inserted into the connectors 37, the fixtures 7 and the elastic member 50.

After the above connection between the connectors 37 of the push cover 30 and the fixtures 7 of the main body 1, one extending end of the elastic member 50 contacts the internal portion 3 of the main body 1, and the other extending end of the elastic member 50 contacts the rear surface of the push cover 30.

Here, one end of the elastic member 50 is inserted into a gap between a pair of the support protrusions 5 formed on the internal portion 3 of the main body 1, thus being fixed to the main body 1 without horizontal fluctuation. Further, a pair of support protrusions 32 are formed on the rear surface of the push cover 30. The other end of the elastic member 50 is inserted into a gap between a pair of support protrusions 32 formed on the rear surface of the push cover 30, thus being fixed to the push cover 30 without horizontal fluctuation.

After the above connection between the connectors 37 of the push cover 30 and the fixtures 7 of the main body is finished, a lower portion of the rear surface of the push cover 30 maintains contact with the holder 10 of the main body 1, as shown in FIG. 2.

As shown in FIG. 3, the above-described memo holder of the present invention is fixed to a designated position of the instrument panel 80 for an automobile by means of clamping brackets 20 and 20'.

A groove (not shown) is formed in a designated position of the instrument panel 80, the push cover 30 of the memo holder fixed to the instrument panel 80 is exposed to the inside of the automobile through the groove.

Here, an outer surface of the push cover 30 coincides with an outer surface of the instrument panel 80 so that overall surface of the instrument panel 80 provided with the memo holder is smooth.

The smooth surface of the instrument panel 80 providing the memo holder is achieved by suitably designing the clamping brackets 20 and 20' of the memo holder and connecting portions of the instrument panel 80 corresponding to the clamping brackets 20 and 20' such that the clamping brackets 20 and 20' fit the connecting portions. In case the clamping brackets 20 and 20' extend from the rear surface of the main body as in this embodiment, a boss portion 82 compensating for the thickness of the main body 1 is formed on an inner surface of the instrument panel 80.

Hereinafter, function and effect of the memo holder in accordance with the above embodiment of the present invention will be described in detail.

The memo holder of the present invention is assembled such that the push cover 30 is rotatably connected to the front surface of the main body 1 fixed to the instrument panel 80 using the elastic force of the elastic member 50.

Thus, as shown in FIG. 4, in a normal state, the outer surface of the push cover 30, which coincides with the outer surface of the instrument panel 80, is exposed to the inside of the automobile, and the lower portion of the rear surface of the push cover 30 maintains contact with the holder 10 of the main body 1.

When an upper portion of the push cover 30 is pushed by a force under the above condition, the push cover 30 rotates centering on the hinge pin 60 located at the central portion of the push cover 30 so that the upper portion of the push cover 30 is directed toward the inside of the main body 1, thus causing the lower portion of the push cover 30 to be separated from the holder 10, as shown in FIG. 5.

When the upper portion of the push cover 30 is directed toward the inside of the main body 1, the upper portion of the push cover 30 presses both ends of the elastic member 50.

Accordingly, in case that papers, such as cards or receipts, are inserted into a gap between the lower portion of the push cover 30 and the holder 10 of the main body 1, and then the force applied to the upper portion of the push cover 30 is eliminated, the push cover 30 is returned to its normal state by restoring force of the elastic member 50 so that the above papers are fixed to the gap between the lower portion of the push cover 30 and the holder 10 of the main body 1.

Here, in case that the surface of the holder 10, i.e., the surface of the support plate 14, has an embossed structure as in this embodiment, the fixing of the papers into the gap between the lower portion of the push cover 30 and the holder 10, i.e., the support plate 14, of the main body 1 is more firmly achieved.

As described above, the memo holder of the present invention serves to store papers made of a soft material as well as cards made of a hard material and is installed in an automobile so that the outer surface of the memo holder coincides with the outer surface of the instrument panel 80, thus having an aesthetically pleasing appearance and high marketability.

Further, the memo holder of the present invention has a spring-type clamp structure, thus being easily used.

As apparent from the above description, the present invention provides a memo holder for storing papers made of a soft material as well as cards made of a hard material, which is installed in an automobile, has a spring-type clamp structure, and is inserted into an instrument panel so that an outer surface of the memo holder coincides with an outer surface of the instrument panel, thus having an aesthetically pleasing appearance and high marketability and utility and minimizing injury to a passenger in case of a vehicular accident.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A memo holder for automobiles comprising:
   a main body fixed to a designated position inside a groove formed in an instrument panel in an automobile, and provided with an internal portion formed by a depression formed into a front surface at a designated depth;
   a holder formed at a lower area of the internal portion of the main body;
   a push cover rotatably hinged to the front surface of the main body;
   an elastic member interposed between the push cover and the main body to provide an elastic force to the push cover when the push cover is rotated; and
   a plurality of protrusions supporting ends of the elastic member in the main body and the push cover,
   wherein the push cover is rotatably hinged at a central portion thereof and cooperates with connectors positioned at a central portion of the main body.

2. The memo holder as set forth in claim 1, wherein the holder includes:
   a protrusion wall formed along an edge of the holder; and
   a support plate connected to an outer circumference of the protrusion wall.

3. The memo holder as set forth in claim 1, wherein the surface of the holder has an embossed structure.

4. The memo holder as set forth in claim 1, wherein:
   a pair of fixtures of the protrusions are formed at a central area of the internal portion of the main body;
   a pair of connectors of the protrusions are formed at a central area of a rear surface of the push cover so that the connectors face the fixtures; and
   a hinge pin is inserted into the fixtures, the connectors and the elastic member under the condition that the elastic member is interposed between the fixtures and the connectors.

5. The memo holder as set forth in claim 1, wherein the outer surface of the push cover coincides with the outer surface of the instrument panel.

\* \* \* \* \*